(12) United States Patent
Mitome et al.

(10) Patent No.: US 6,567,516 B1
(45) Date of Patent: May 20, 2003

(54) METHOD AND DEVICE FOR CONTROLLING AFFILIATION OF REMOTE LINE-COLLECTION DEVICE WITH SWITCH

(75) Inventors: Hirofumi Mitome, Fukuoka (JP); Akihiro Horiuchi, Fukuoka (JP); Hiromitsu Kajiyama, Fukuoka (JP); Shunichi Shibata, Fukuoka (JP); Kenji Maeda, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/346,388

(22) Filed: Jul. 1, 1999

(30) Foreign Application Priority Data

Feb. 17, 1999 (JP) .......................... 11-039101

(51) Int. Cl.[7] ............................... H04M 3/00
(52) U.S. Cl. ................ 379/279; 379/221.01; 379/268; 379/271; 379/272; 379/273
(58) Field of Search .................... 379/221.01, 268, 379/269, 279, 334, 219, 271, 272, 273

(56) References Cited

U.S. PATENT DOCUMENTS 5,784,449 A * 7/1998 Ardon ..................... 379/230
5,848,053 A * 12/1998 Ardon ..................... 370/218
5,854,834 A * 12/1998 Gottlieb et al. ......... 379/114.04
5,912,963 A * 6/1999 Begeja et al. ........... 379/221.01
6,188,759 B1 * 2/2001 Lorenzen et al. ....... 379/220.01
6,208,856 B1 * 3/2001 Jonsson .................. 455/424

FOREIGN PATENT DOCUMENTS

JP       1-194795     8/1989
JP       5-48628      2/1993

* cited by examiner

Primary Examiner—Ahmad F. Matar
Assistant Examiner—Bing Bui
(74) Attorney, Agent, or Firm—Katten Muchin Zavis Roseman

(57) ABSTRACT

A method of controlling affiliation of a remote line-collection device with a plurality of switches connected via a network includes the steps of providing each switch with a backup-storage area in advance in addition to a normal storage area, and transferring control data of the remote line-collection device from the normal storage area of a first switch to the backup-storage area of a second switch when affiliation of the remote line-collection device is changed from the first switch to the second switch.

2 Claims, 18 Drawing Sheets

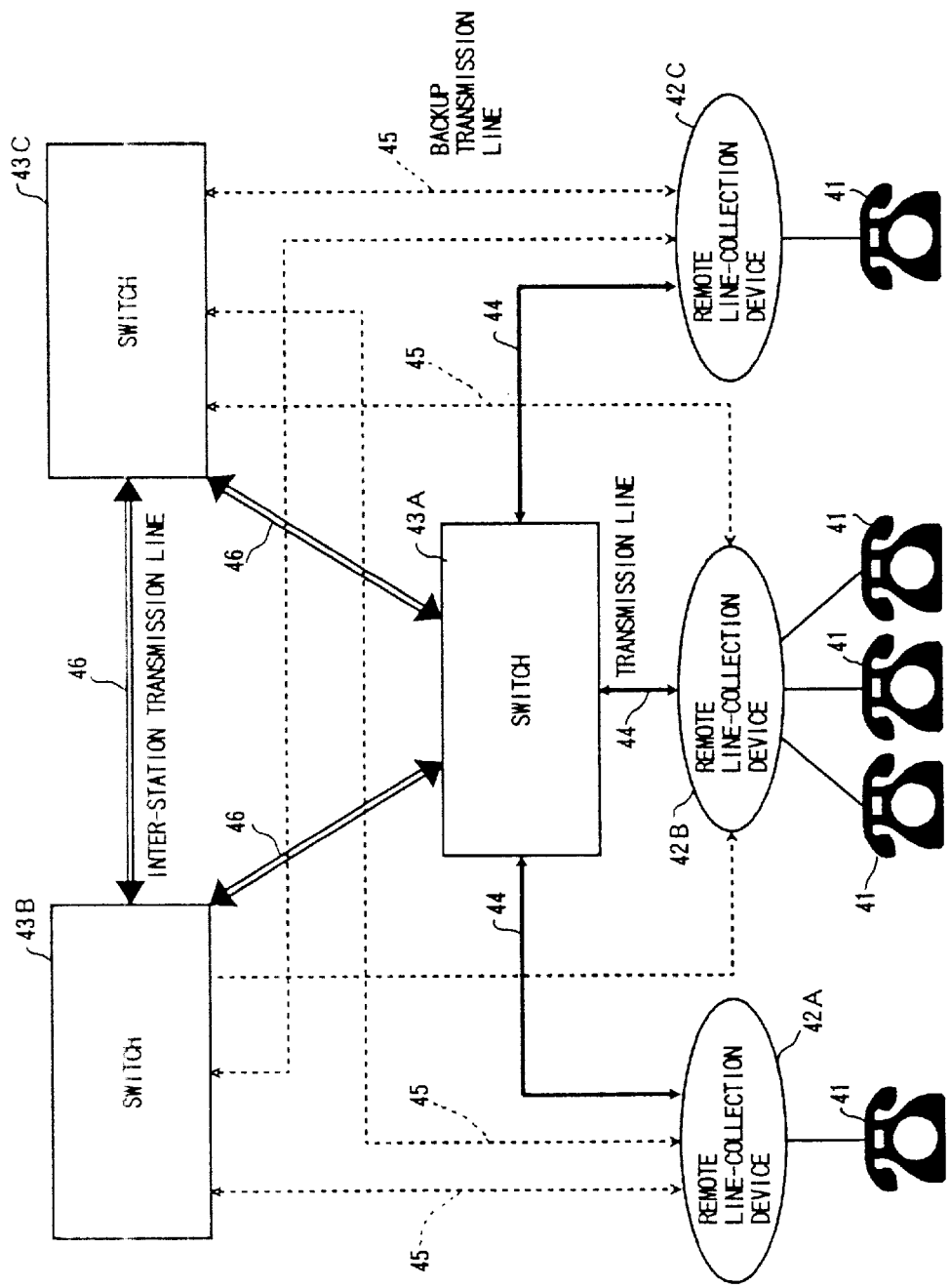

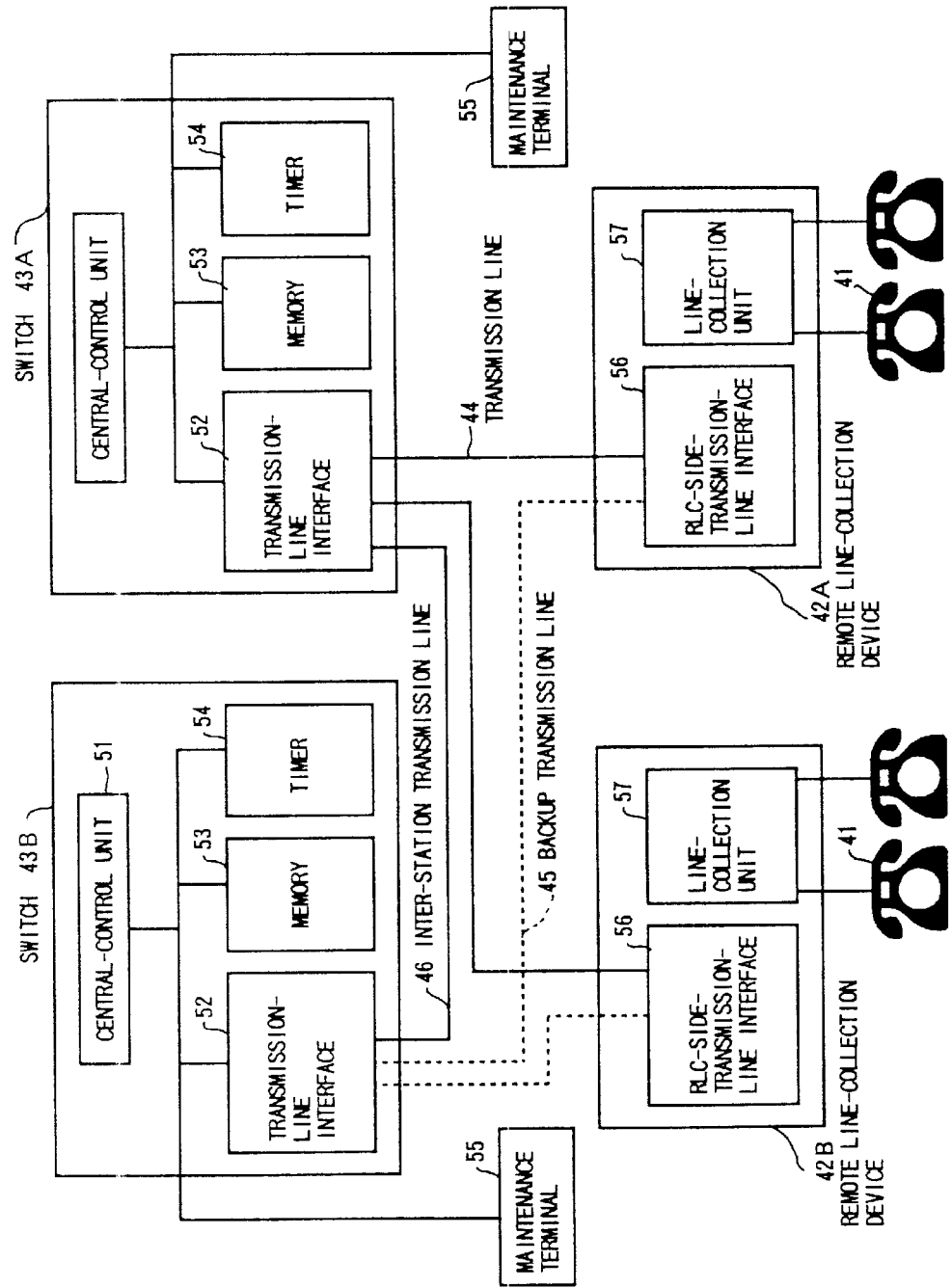

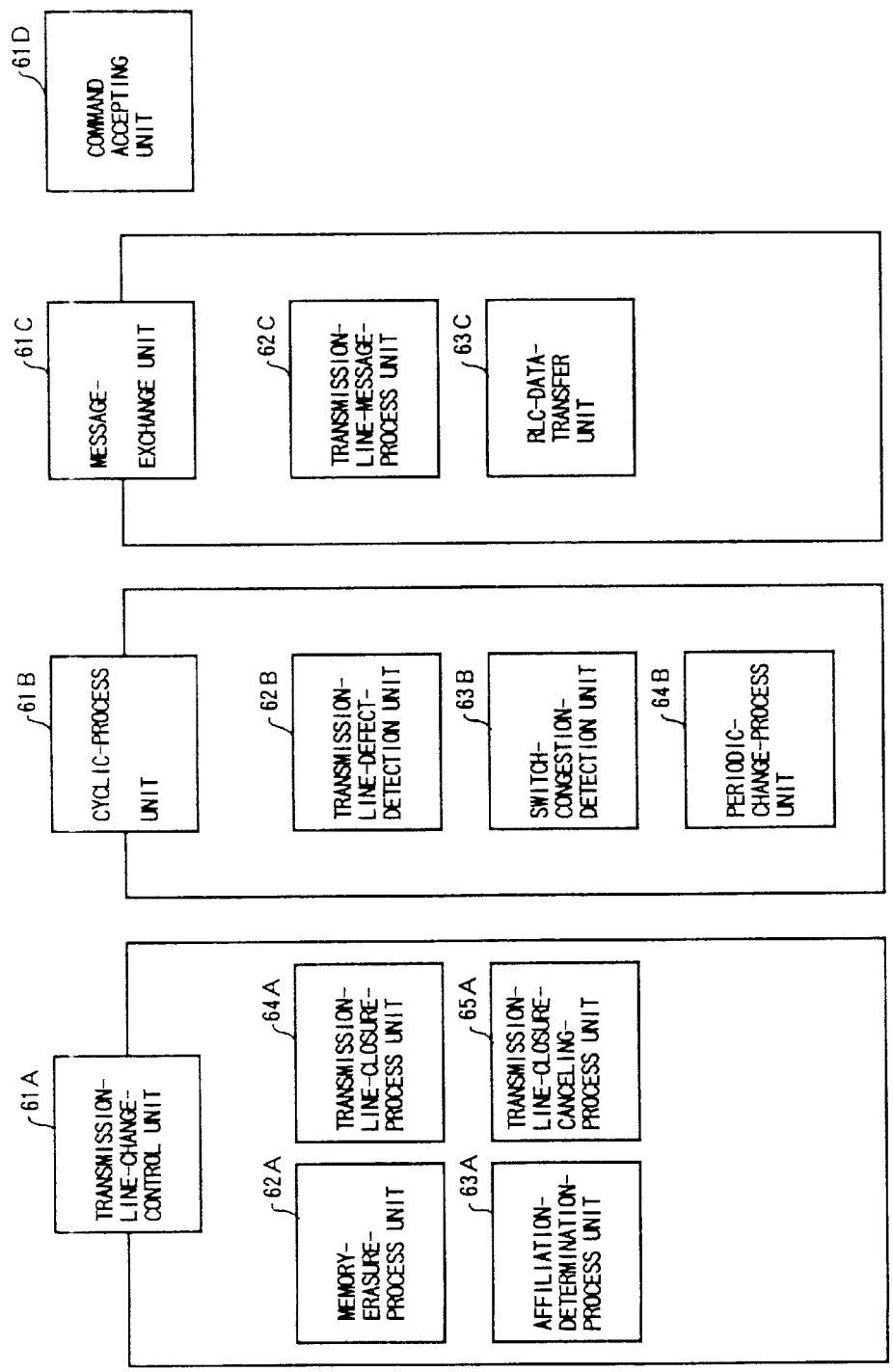

METHOD AND DEVICE FOR CONTROLLING AFFILIATION OF REMOTE LINE-COLLECTION DEVICE WITH SWITCH

BACKGROUND OF THE INVENTION

1. Field of the Invention

The present invention generally relates to a method of and a device for controlling switches with regard to affiliation of remote line-collection devices, and particularly relates to a method of and a device for controlling switches with regard to affiliation of remote line-collection devices when the affiliation of remote line-collection devices is changed from a switch to switch.

In recent years, there have been increasing competitions in rendering telephone services between different carriers. An increase in the competitions demands a cost reduction and simpler networks that are easier to be maintained. This is achieved by simplifying network configurations of station switches, which have become exceedingly complex due to use of mobile-communication networks, digital communication networks, etc., in addition to use of general telephone network. To this end, integration of host stations has been underway with an aim of achieving a simplified network, in which large-capacity station switches would be used as a core for affiliated remote line-collection devices.

2. Description of the Related Art

Remote line-collection devices are not provided with a switching function, and are only equipped with a function to multiplex and demultiplex communication lines. Such remote line-collection devices are conventionally installed in remote locations away from switches, and are controlled by the switches. This configuration is typically used in order to enhance efficient use of resources by installing remote line-collection devices in areas where fewer subscribers are located and by connecting the remote line-collection devices with switches situated at remote positions.

FIG. 1 is an illustrative drawing showing a network configuration for controlling affiliation of remote line-collection devices in the related art. In FIG. 1, switches 1 through n together form a network, and are monitored by a centralized maintenance center 10. In normal operations, remote line-collection devices RLC(A) through RLC(C) are affiliated with (belong to) the switch 1, and have the switch n as a backup switch to be affiliated with. Remote line-collection devices RLC(D) and RLC(E) are affiliated with the switch 2 in normal operations, and the switch 1 serves as a backup switch for these remote line-collection devices. Further, remote line-collection devices RLC(F) and RLC(G) belong to (are affiliated with) the switch n, and have the switch 2 as a backup switch.

In the network comprised of the switches 1 through n, the remote line-collection devices RLC(A) through RLC(C) are affiliated not only with the switch 1 but also with the switch n. When a transmission line suffers malfunction, a switch has to be made from the current transmission line to a backup transmission line, and, thus, RLC data of all the remote line-collection devices needs to be provided in duplicate. Because of this, the switch n has not only RLC data DRLC(F) and DRLC(G) (i.e., data of the remote line-collection devices RLC(F) and RLC(G)) but also RLC data DRLC(A) and DRLC(C) (i.e., data of the remote line-collection devices RLC(A) through RLC(C)). Here, the RLC data refers to control data that is necessary for controlling a remote line-collection device from a affiliated switch.

In this manner, the switch n, which does not control the remote line-collection devices RLC(A) through RLC(C) during normal operations, needs to have a RLC-data-storage area that has the same capacity as that of the switch 1. The need for such an excessive memory space leads to a cost increase.

Further, when RLC data DRLC(A) of the remote line-collection device RLC(A) is modified in the switch 1, for example, the same data modification needs to be made in the switch n despite the fact that the switch n does not control the remote line-collection device RLC(A) during normal operations. Such modification has a huge impact on processing capacities of the switches 1 and n and traffic between the switches 1 and n. RLC-data modification during a high traffic period of a daytime, which affects call processing seriously, may trigger a system shutdown by exceeding a limit that the system can handle.

In consideration of such a risk, RLC-data modification tends to be carried out during a nighttime when traffic is low. This creates concerns about convenience and safety of maintenance work, and results in a cost increase because of a need for higher wages for nighttime maintenance workers.

Accordingly, there is a need for such a method of and a device for controlling switches with regard to affiliation of remote line-collection devices that a control-data-storage area can be reduced in size and an increase in traffic caused by modification of control data can be reduced.

SUMMARY OF THE INVENTION

Accordingly, it is a general object of the present invention to provide a method of and a device for controlling switches which can satisfy the need described above.

It is another and more specific object of the present invention to provide such a method of and a device for controlling switches with regard to affiliation of remote line-collection devices that a control-data-storage area can be reduced in size and an increase in traffic caused by modification of control data can be reduced.

In order to achieve the above objects according to the present invention, a method of controlling affiliation of a remote line-collection device with a plurality of switches connected via a network includes the steps of providing each switch with a backup-storage area in advance in addition to a normal storage area, and transferring control data of the remote line-collection device from the normal storage area of a first switch to the backup-storage area of a second switch when affiliation of the remote line-collection device is changed from the first switch to the second switch.

In the method described above, each switch stores control data of remote line-collection devices that belong thereto in the normal storage area during normal operations, and does not have the control data of the remote line-collection device stored therein despite the fact that this remote line-collection device will be affiliated therewith when a backup switch is necessary. Because of this configuration, control data of a given remote line-collection device is modified without seriously affecting traffic of data. Further, since the backup area of a given switch needs to have only the smallest necessary space for storing control data of remote line-collection devices that may use the given switch as a backup switch, a total size of the memory space for storing control data can be significantly reduced in comparison with a size of a memory space required in the related art.

Other objects and further features of the present invention will be apparent from the following detailed description when read in conjunction with the accompanying drawings.

BRIEF DESCRIPTION OF THE DRAWINGS

FIG. 2 is an illustrative drawing showing a configuration of a network system in which switches are controlled with regard to affiliation of remote line-collection devices according to the present invention;

FIG. 3 is a block diagram showing hardware configurations of the switches and the remote line-collection devices;

FIG. 4 is an illustrative drawing showing functional blocks of a central-control unit;

DESCRIPTION OF THE PREFERRED EMBODIMENTS

Figure 1:
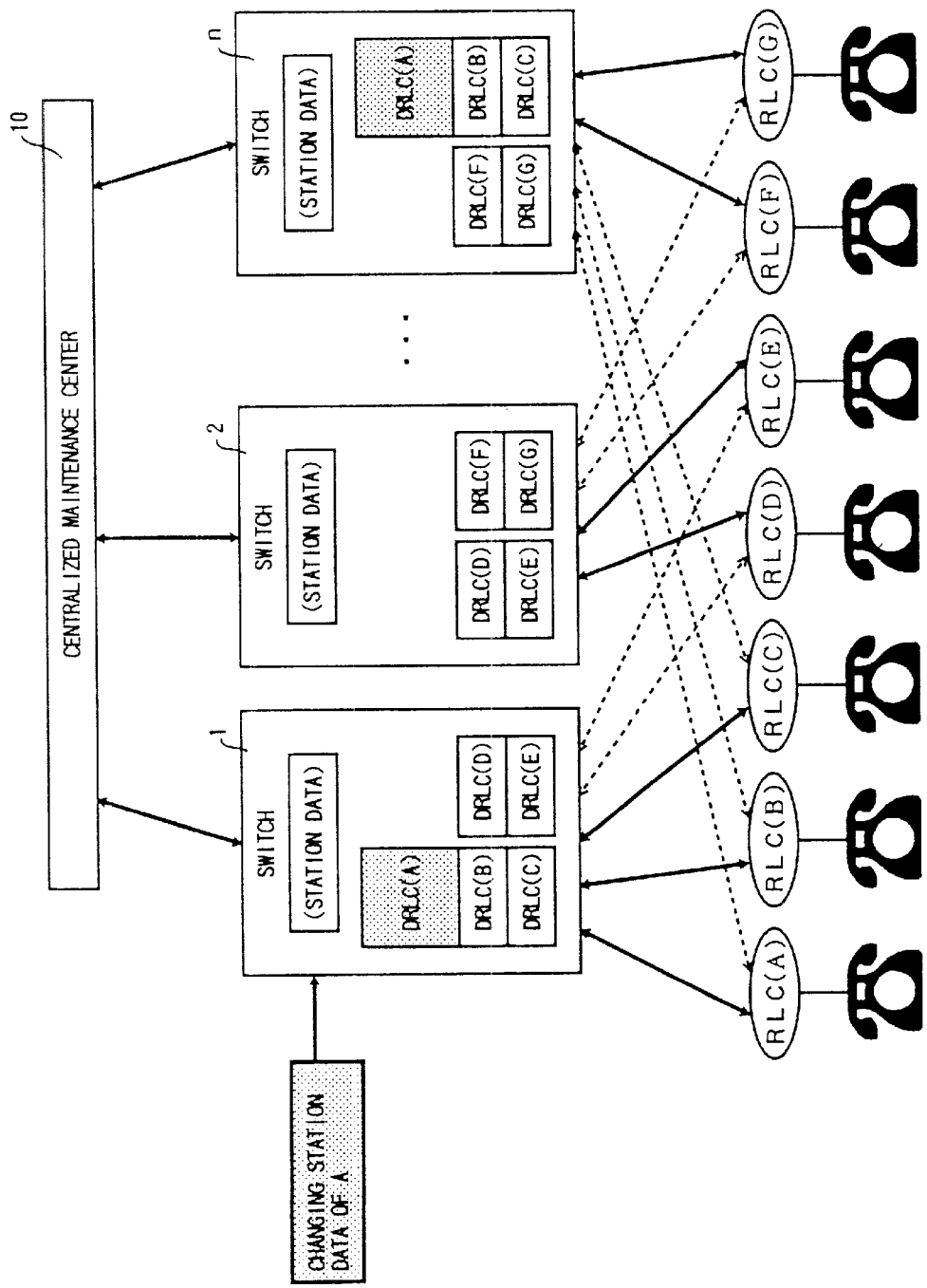
FIG. 1 is an illustrative drawing showing a network configuration for controlling affiliation of remote line-collection devices in the related art.

In the following, embodiments of the present invention will be described with reference to the accompanying drawings.

FIG. 2 is an illustrative drawing showing a configuration of a network system in which switches are controlled with regard to affiliation of remote line-collection devices according to the present invention.

In FIG. 2, subscriber terminals 41 are connected to remote line-collection devices 42A through 42C. The remote line-collection devices 42A through 42C are connected to a switch 43A via transmission lines 44. Each of the remote line-collection devices 42A through 42C is connected to each of the switches 43B and 43C via backup transmission lines 45. The switches 43A through 43C are connected with each other via inter-station transmission lines 46. Each of the switches 43A through 43C is monitored by a centralized maintenance center (not shown).

FIG. 3 is a block diagram showing hardware configurations of the switches and the remote line-collection devices.

Each of the switches 43A and 43B includes a central-control unit 51, a transmission-line interface 52, a memory 53, and a timer 54. The central-control unit 51 attends to line switching. The transmission line interface 52 establishes connections with switches, remote line-collection devices, a maintenance terminal, and the centralized maintenance center. The memory 53 stores control information regarding the remote line-collection devices and information on the subscriber terminals connected to the remote line-collection devices. The timer 54 is used for controlling cyclic processing and the like.

Each of the switches 43A and 43B is connected to a maintenance terminal 55, which is used for entering a command, an example of which is a command for modifying an affiliation of a remote line-collection device that is currently affiliated to the pertinent switch.

Each of the remote line-collection devices 42A and 42B includes a RLC-side-transmission-line interface 56 connected to the switches and a line-collection unit 57 for accommodating the subscriber terminals 41. The remote line-collection devices are equipped with a function to collect lines, and do not posses a switching function. That is, there is no central control unit or a memory in the remote line-collection devices.

FIG. 4 is an illustrative drawing showing functional blocks of the central-control unit 51.

In FIG. 4, a transmission-line-change-control unit 61A attends to overall control of transmission-line-change processes. The transmission-line-change-control unit 61A includes a memory-erasure-process unit 62A, a affiliation-determination-process unit 63A, a transmission-line-closure-process unit 64A, and a transmission-line-closure-canceling-process unit 65A. The memory-erasure-process unit 62A eliminates RLC data. The affiliation-determination-process unit 63A determines affiliation of a remote line-collection device. The transmission-line-closure-process unit 64A closes a transmission line. The transmission-line-closure-canceling-process unit 65A cancels closure of the transmission line.

A cyclic-process unit 61B includes a transmission-line-defect-detection unit 62B, a switch-congestion-detection unit 63B, and a periodic-change-process unit 64B. The transmission-line-defect-detection unit 62B detects a defect of a transmission line. The cyclic-process unit 61B monitors a cause of a change to a new transmission line, and informs the transmission-line-change-control unit 61A of the cause if the cause is detected.

A message-exchange unit 61C includes a transmission-line-message-process unit 62C and a RLC-data-transfer unit 63C. The message-exchange unit 61C edits a request from the transmission-line-change-control unit 61A, and exchanges messages with other switches. A command accepting unit 61D accepts a command when the command is sent from a maintenance worker. Such a command may be a request for changing of a transmission line, for example. The command accepting unit 61D notifies the transmission-line-change-control unit 61A when it accepts a command.

Figure 5B:
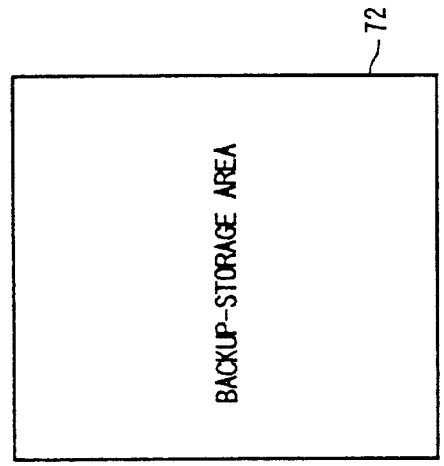
FIGS. 5A and 5B are illustrative drawings showing a data structure of RLC data in a memory space of a switch according to the present invention.
Figure 5A:
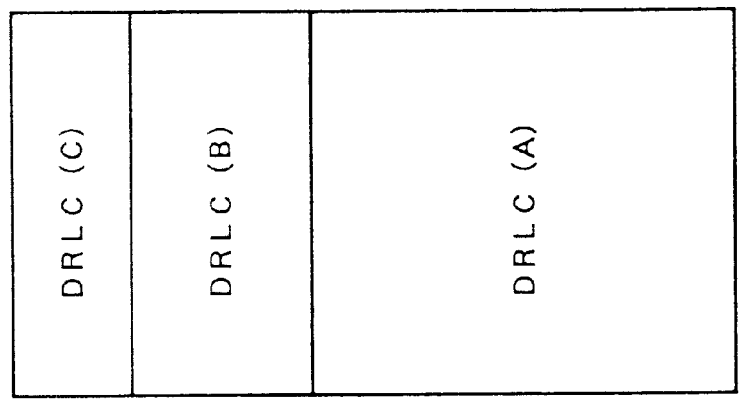

FIGS. 5A and 5B are illustrative drawings showing a data structure of RLC data in a memory space of a switch according to the present invention.

As shown in FIG. 5A, the latest RLC data DRLC(A) through DRLC(C) is stored with respect to all the remote line-collection devices that belong to the switch during normal operations. As shown in FIG. 5B, each switch is provided with a backup-storage area 72. The backup-storage area 72 has a storage space that is sufficient for storing any RLC data. Here, the RLC data refers to data that is necessary for control of a remote line-collection device affiliated to the pertinent switch.

Figure 6:
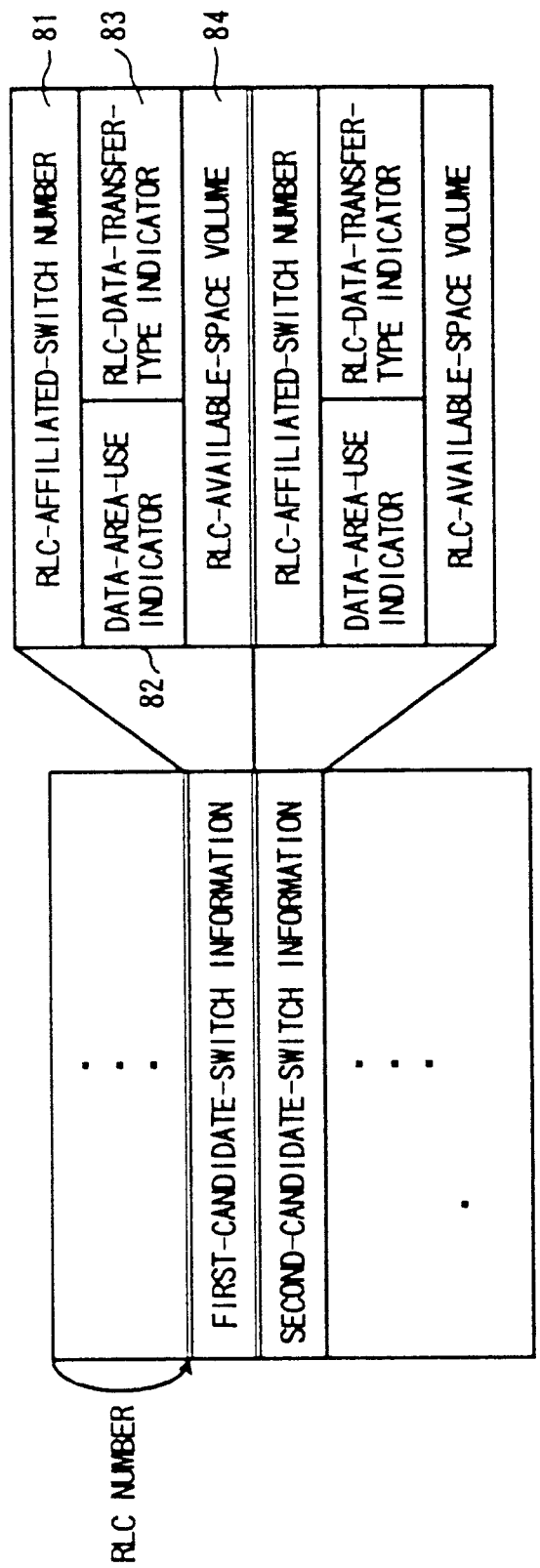
FIG. 6 is an illustrative drawing showing a structure of RLC-affiliation-storage data that is stored in a memory of a switch.

FIG. 6 is an illustrative drawing showing a structure of RLC-affiliation-storage data that is stored in the memory 53 of a switch.

Candidate-switch information, which is provided with respect to each candidate, includes a RLC-affiliated-switch number 81, a data-area-use indicator 82, a RLC-data-transfer-type indicator 83, and a RLC-data-available-space volume 84. The RLC-data-transfer-type indicator 83 is used for indicating whether full data is transferred or differential data is transferred. Reference is made based on a specified RLC number.

Figure 7:
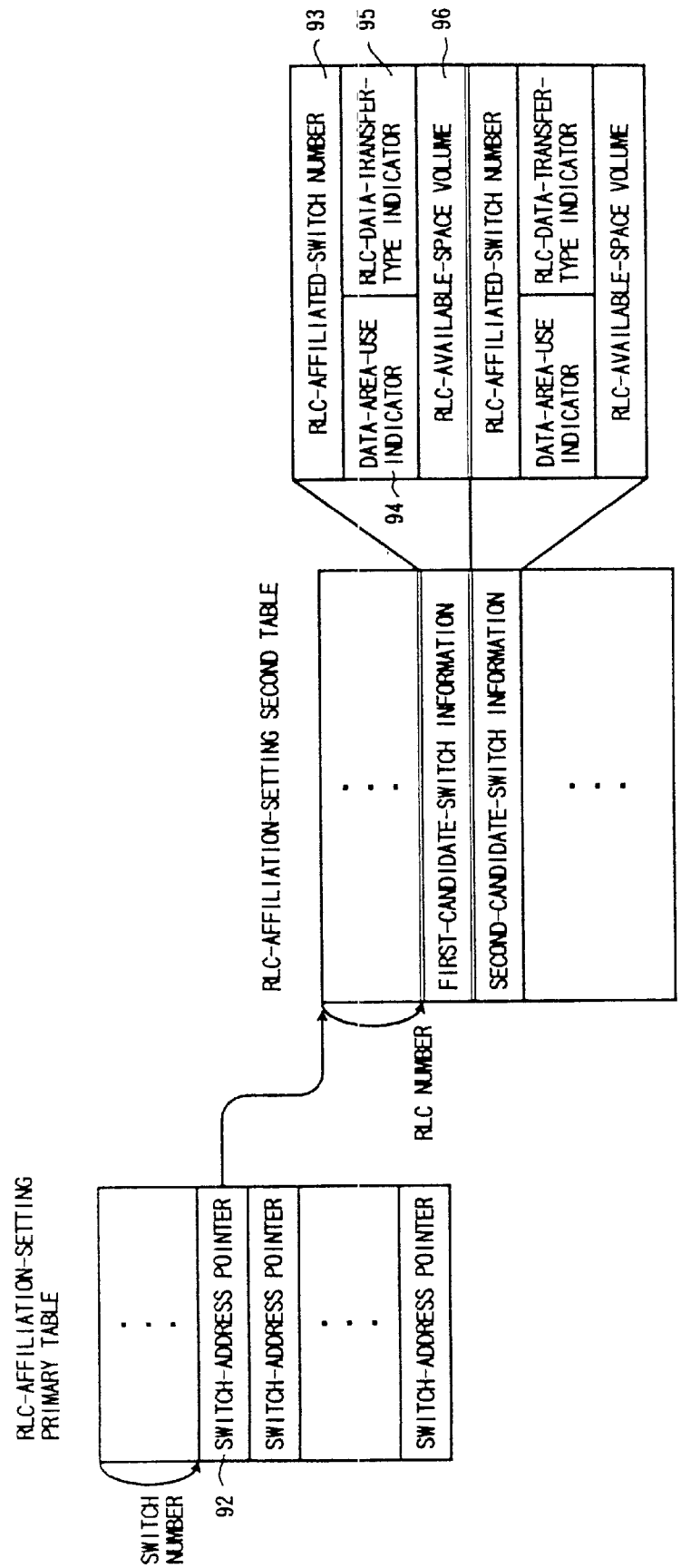
FIG. 7 is an illustrative drawing showing a structure of RLC-affiliation-setting data used in a centralized maintenance center.

FIG. 7 is an illustrative drawing showing a structure of RLC-affiliation-setting data used in the centralized maintenance center.

A RLC-affiliation-setting primary table stores a switch-address pointer 92 with respect to each candidate for an affiliated switch. A switch-address pointer 92 is referenced by a switch number. A switch-address pointer 92 that is made reference to is used for retrieving a RLC-affiliation-setting secondary table. The RLC-affiliation-setting secondary table includes candidate-switch information with respect to each candidate. The candidate-switch information includes a RLC-affiliated-switch number 93, a data-area-use indicator 94, a RLC-data-transfer-type indicator 95, and a RLC-data-available-space volume 96. The RLC-data-transfer-type indicator 95 indicates whether full data is transferred or differential data is transferred. Reference is made based on a specified RLC number.

Figure 8:
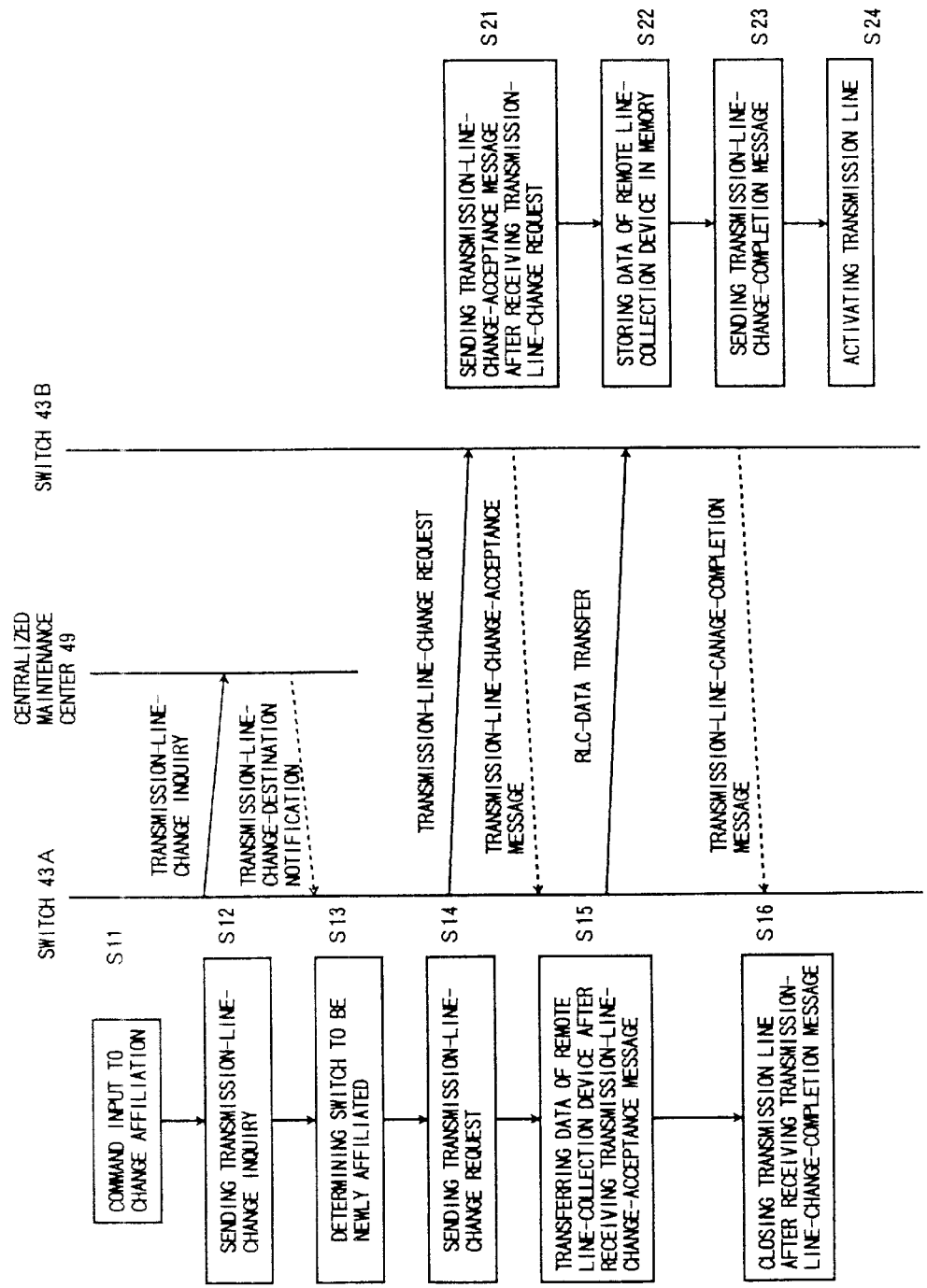
FIG. 8 is a line-change-process sequence and a flowchart of processes performed by switches according to a first embodiment of the present invention.

FIG. 8 is a line-change-process sequence and a flowchart of processes performed by switches according to a first embodiment of the present invention.

In the following, a description will be given first with regard to a process of the switch 43A with which the remote line-collection device 42A is affiliated.

At a step S11, a command is entered at the maintenance terminal 55 of the switch 43A in order to change an affiliation of the remote line-collection device 42A from the switch 43A to the switch 43B. In response, the command accepting unit 61D accepts the affiliation-change command.

At a step S12, the transmission-line-change-control unit 61A hands over control to the transmission-line-message-process unit 62C, and a transmission-line-change-inquiry message is edited and transmitted via the message-exchange unit 61C in order to make inquiries to the centralized maintenance center 49 about a new switch with which the remote line-collection device 42A will be affiliated. When the message is transmitted, a data-use volume of the remote line-collection device 42A is attached to the message.

The centralized maintenance center 49 determines a new switch, to which the remote line-collection device 42A will belong. Then, the message-exchange unit 61C receives a transmission-line-change-notification message from the centralized maintenance center 49.

At a step S13, the transmission-line-change-control unit 61A attends to processing for determining a new switch.

In detail, the centralized maintenance center 49 makes reference to the RLC-affiliation-setting primary table of FIG. 7 by using a switch number, thereby obtaining a RLC-affiliation-setting secondary table corresponding to the current switch by using the switch-address pointer.

Then, reference is made to the RLC-affiliation-setting secondary table by using a RLC number of the remote line-collection device which needs to change an affiliation thereof. As a result, a RLC-affiliated-switch number, a data-area-use indicator, a RLC-data-transfer-type indicator, and a RLC-data-availabe-space volume are obtained. The centralized maintenance center 49 subtract from the RLC-data-availabe-space volume the data-use volume of the remote line-collection device 42A that was received along with the transmission-line-change-inquiry message, thereby checking whether the new switch can store all the necessary data.

The switch 43A receives the above-described information as the transmission-line-change-notification message from the centralized maintenance center 49, and the affiliation-determination-process unit 63A stores the received information as part of the RLC-affiliation-storage data in the memory 53 as shown in FIG. 6. This data is made reference to by using the RLC number of the pertinent remote line-collection device, so that the number of the new switch is stored as the RLC-affiliated-switch number, and the RLC-data-transfer-type indicator 83 is set in accordance with the received information. Further, the data-area-use indicator is set so as to indicate use of the data area.

After the new switch is determined, at a step S14, the transmission-line-message-process unit 62C edits a transmission-line-change-request message, and transmits it to the new switch via the message-exchange unit 61C. This message notifies the new switch 43B of a change of transmission lines, and, also, makes sure that the new switch 43B is not suffering a malfunction, a process congestion, or the like, and is thus in condition for accepting the change.

At a step S15, the message-exchange unit 61C receives a transmission-line-change-acceptance message from the new switch, and, then, the RLC-data-transfer unit 63C is activated by the transmission-line-change-control unit 61A so as to transfer the RLC data of the remote line-collection device 42A to the new switch 43B.

At a step S16, the message-exchange unit 61C receives a transmission-line-change-completion message from the new switch, and, then, the transmission-line-closure-process unit 64A under the control of the transmission-line-change-control unit 61A closes the transmission-line interface 52 of the relevant transmission line. This ends the transmission-line-change process.

In the following, a description will be given with regard to a process of the newly affiliated switch 43B.

At a step S21, the message-exchange unit 61C receives the transmission-line-change-request message, and, then, the transmission-line-change-control unit 61A checks the backup-storage area 72 of FIG. 5B so as to determine whether there is a sufficient space for controlling the remote line-collection device. If there is a sufficient space, the transmission-line-message-process unit 62C edits the transmission-line-change-acceptance message, and transmits it via the message-exchange unit 61c. Here, transmission of the transmission-line-change-acceptance message does not necessarily have to be carried out.

At a step S22, the RLC data is received from the old switch 43A, and the transmission-line-change-control unit 61A stores the received data in the backup-storage area 72.

At a step S23, the transmission-line-message-process unit 62C edits the transmission-line-change-completion message, and transmits it to the old switch via the message-exchange unit 61C.

At a step S24, the transmission-line-closure-canceling-process unit 65A cancels closure of the transmission-line interface with respect to a relevant transmission line, thereby activating the relevant backup transmission line 45. This ends the process of changing affiliation.

In this manner, a switch stores only the control data of remote line-collection devices that are affiliated with the switch during normal operations, so that data needs to be modified only at this switch when there is a need to modify the control data. This reduces undesirable interference with traffic. Further, a backup-storage area is all that is necessary at the switch, and has a storage space just as large as a size of the control data of remote-line-collection devices that may be affiliated with the switch as a backup. This results in a significant reduction in the size of the control-data storage area compared with the related-art configuration.

Figure 9:
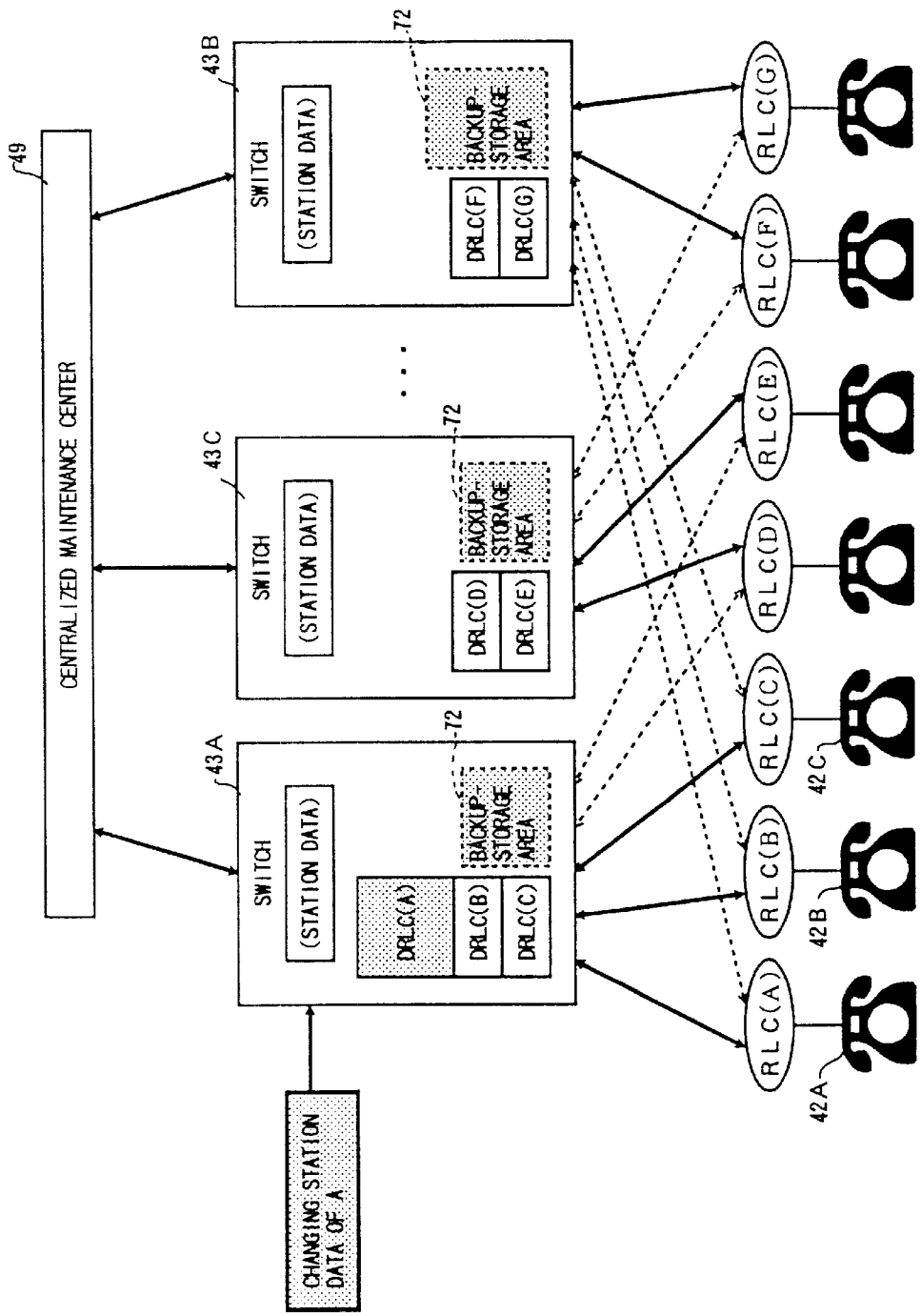
FIG. 9 is an illustrative drawing showing connections between switches and remote line-collection devices during normal operations of a network.

FIG. 9 is an illustrative drawing showing connections between the switches 43A through 43C and the remote line-collection devices 42A through 42C during normal operations of a network.

In this situation, each of the backup-storage areas 72 of the switches 43A through 43C does not include RCL data.

Figure 10:
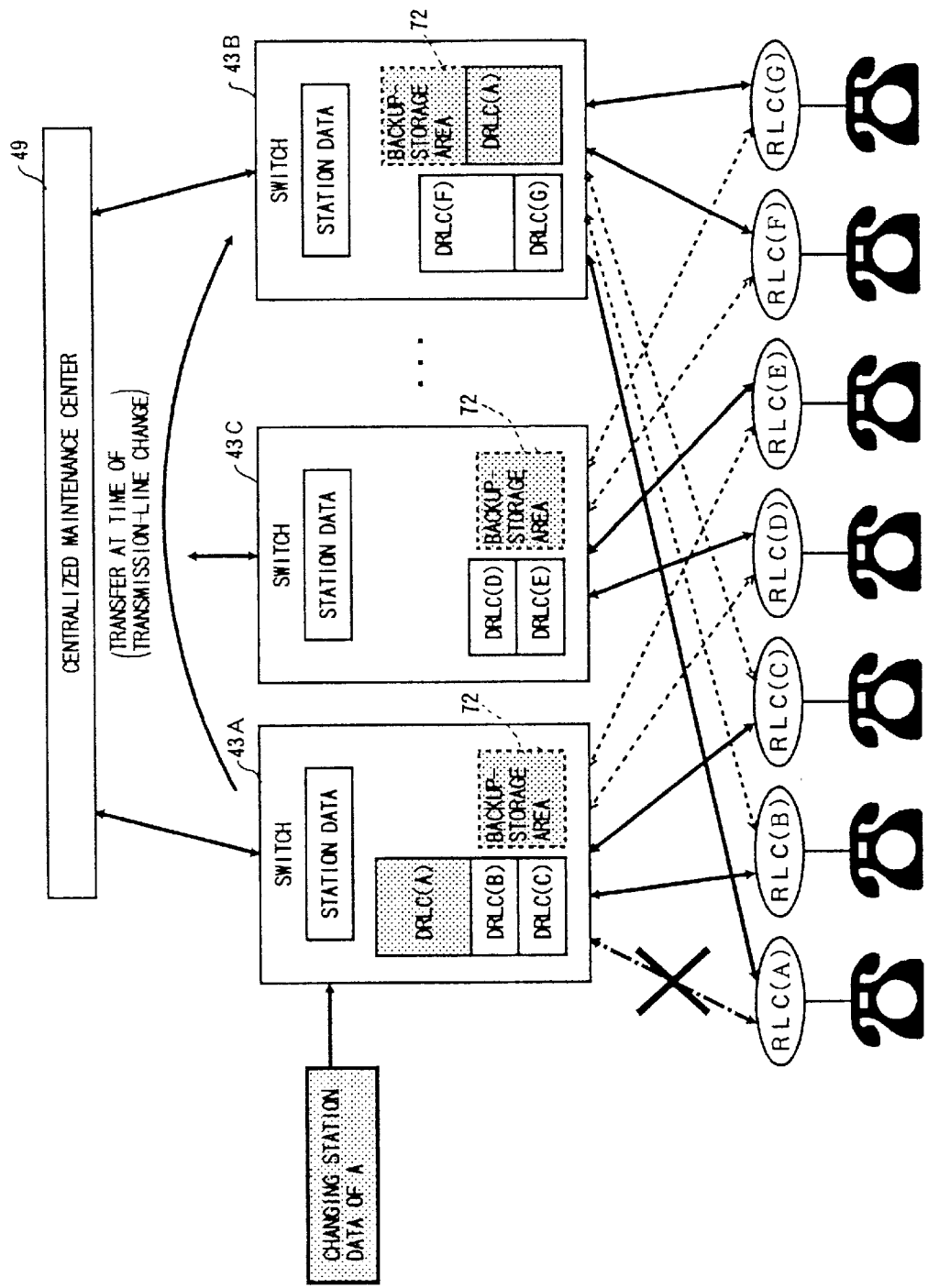
FIG. 10 is an illustrative drawing showing connections between the switches and the remote line-collection devices after the process of changing affiliation of FIG. 8.

FIG. 10 is an illustrative drawing showing connections between the switches 43A through 43C and the remote line-collection devices 42A through 42C after the process of changing affiliation of FIG. 8.

In FIG. 10, the backup-storage area 72 of the switch 43B includes the RLC data DRLC(A) of the remote line-collection device 42A as the RLC data DRLC(A) is transferred from the switch 43A.

Figure 11:
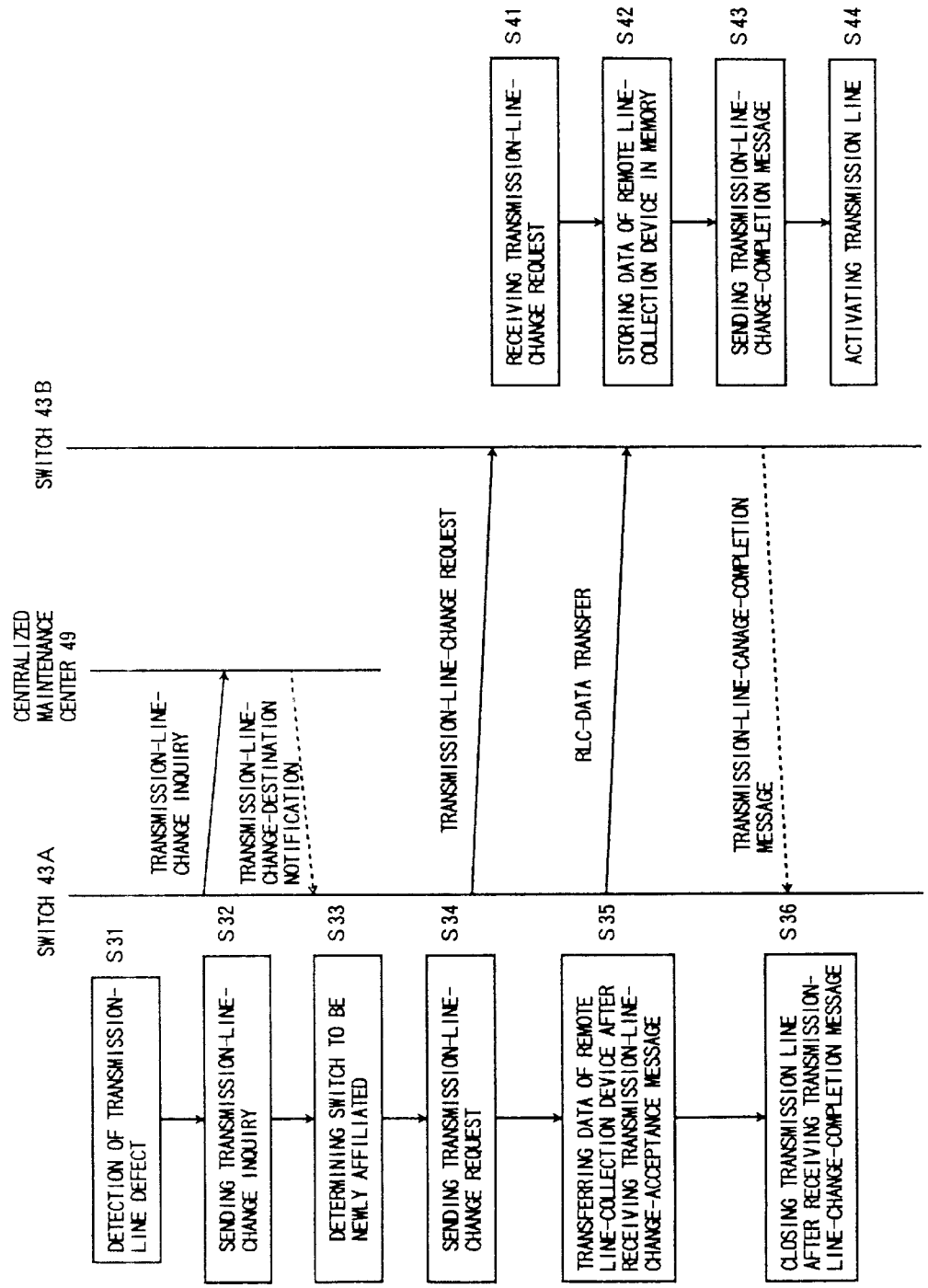
FIG. 11 is a line-change-process sequence and a flowchart of processes performed by switches according to a second embodiment of the present invention.

FIG. 11 is a line-change-process sequence and a flowchart of processes performed by switches according to a second embodiment of the present invention.

In the following, a description will be given first with regard to a process of the switch 43A with which the remote line-collection device 42A is affiliated.

At a step S31, the transmission-line-defect-detection unit 62B under the control of the cyclic-process unit 61B detects a defect on a transmission line between the switch 43A and the remote line-collection device 42A. In response, control is handed over to the transmission-line-change-control unit 61A in order to attend to a transmission-line-change process.

At a step S32, the transmission-line-change-control unit 61A hands over control to the transmission-line-message-process unit 62C, and a transmission-line-change-inquiry message is edited and transmitted via the message-exchange unit 61C in order to make inquiries to the centralized maintenance center 49 about a new switch with which the remote line-collection device 42A will be affiliated.

The centralized maintenance center 49 determines a new switch, to which the remote line-collection device 42A will belong. Then, the message-exchange unit 61C receives a transmission-line-change-notification message from the centralized maintenance center 49.

At a step S33, the transmission-line-change-control unit 61A attends to processing for determining a new switch.

After the new switch is determined, at a step S34, the transmission-line-message-process unit 62C edits a transmission-line-change-request message, and transmits it to the new switch 43B via the message-exchange unit 61C. This message notifies the new switch 43B of a change of transmission lines.

Immediately after transmitting the transmission-line-change-request message, at a step S35, the RLC-data-transfer unit 63C is activated by the transmission-line-change-control unit 61A so as to transfer the RLC data of the remote line-collection device 42A to the new switch 43B.

At a step S36, the message-exchange unit 61C receives a transmission-line-change-completion message from the new switch, and, then, the transmission-line-closure-process unit 64A under the control of the transmission-line-change-control unit 61A closes the transmission-line interface 52 of the relevant transmission line. This ends the transmission-line-change process.

In the following, a description will be given with regard to a process of the newly affiliated switch 43B.

At a step S41, the message-exchange unit 61C receives the transmission-line-change-request message, and, then, the transmission-line-change-control unit 61A checks the backup-storage area 72 of FIG. 5B so as to determine whether there is a sufficient space for controlling the remote line-collection device.

At a step S42, the RLC data is received from the old switch 43A, and the transmission-line-change-control unit 61A stores the received data in the backup-storage area 72.

At a step S43, the transmission-line-message-process unit 62C edits the transmission-line-change-completion message, and transmits it to the old switch via the message-exchange unit. 61C.

At a step S44, the transmission-line-closure-canceling-process unit 65A cancels closure of the transmission-line interface with respect to a relevant transmission line, thereby activating the relevant backup transmission line 45. This ends the process of changing affiliation.

Figure 12:
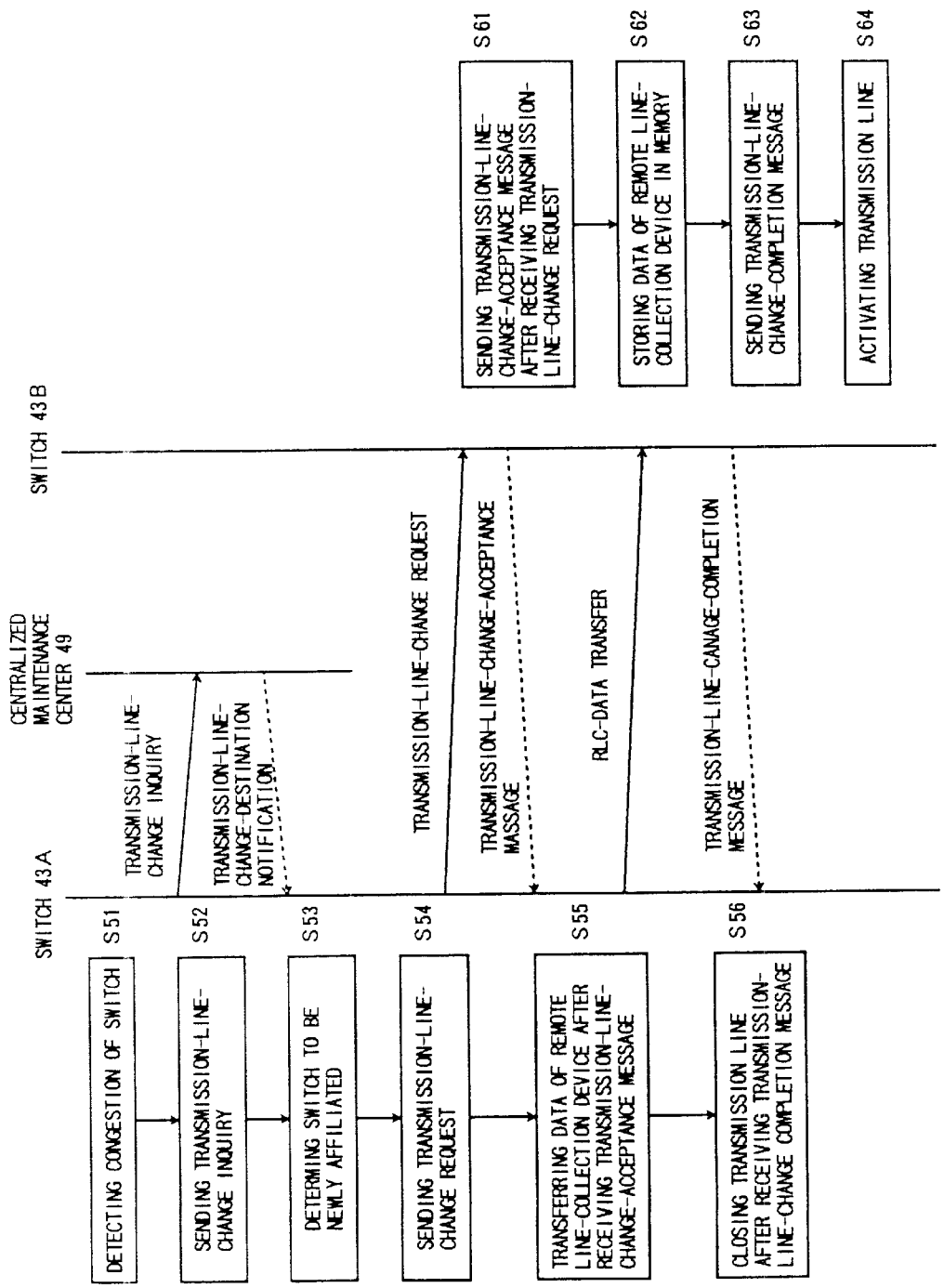
FIG. 12 is a line-change-process sequence and a flowchart of processes performed by switches according to a third embodiment of the present invention.

FIG. 12 is a line-change-process sequence and a flowchart of processes performed by switches according to a third embodiment of the present invention.

In the following, a description will be given first with regard to a process of the switch 43A with which the remote line-collection device 42A is affiliated.

At a step S51, the switch-congestion-detection unit 63B under the control of the cyclic process unit 61B detects performance congestion of the switch. In response, control is handed over to the transmission-line-change-control unit 61A in order to attend to a transmission-line-change process.

At a step S52, the transmission-line-change-control unit 61A hands over control to the transmission-line-message-process unit 62C, and a transmission-line-change-inquiry message is edited and transmitted via the message-exchange unit 61C in order to make inquiries to the centralized maintenance center 49 about a new switch with which the remote line 30 collection device 42A will be affiliated. When the message is transmitted, a data-use volume of the remote line-collection device 42A is attached to the message.

The centralized maintenance center 49 determines a new switch, to which the remote line 35 collection device 42A will belong. Then, the message-exchange unit 61C receives a transmission-line-change-notification message from the centralized maintenance center 49.

At a step S53, the transmission-line-change-control unit 61A attends to processing for determining a new switch.

After the new switch is determined, at a step S54, the transmission-line-message-process unit 62C edits a transmission-line-change-request message, and transmits it to the new switch 43B via the message-exchange unit 61C. This message notifies the new switch 43B of a change of transmission lines, and, also, makes sure that the new switch 43B is not suffering a malfunction, a process congestion, or the like, and is thus in condition for accepting the change.

At a step S55, the message-exchange unit 61C receives a transmission-line-change-acceptance message from the new switch, and, then, the RLC-data-transfer unit 63C is activated by the transmission-line-change-control unit 61A so as to transfer the RLC data of the remote line-collection device 42A to the new switch 43B.

At a step S56, the message-exchange unit 61C receives a transmission-line-change-completion message from the new switch, and, then, the transmission-line-closure-process unit 64A under the control of the transmission-line-change-control unit 61A closes the transmission-line interface 52 of the relevant transmission line. This ends the transmission-line-change process.

In the following, a description will be given with regard to a process of the newly affiliated switch 43B.

At a step S61, the message-exchange unit 61C receives the transmission-line-change-request message, and, then, the transmission-line-change-control unit 61A checks the backup-storage area 72 of FIG. 5B so as to determine whether there is a sufficient space for controlling the remote line-collection device. If there is a sufficient space, the transmission-line-message-process unit 62C edits the transmission-line-change-acceptance message, and transmits it via the message-exchange unit 61C. Here, transmission of the transmission-line-change-acceptance message does not necessarily have to be carried out.

At a step S62, the RLC data is received from the old switch 43A, and the transmission-line-change-control unit 61A stores the received data in the backup-storage area 72.

At a step S63, the transmission-line-message-process unit 62C edits the transmission-line-change-completion message, and transmits it to the old switch via the message-exchange unit 61C.

At a step S64, the transmission-line-closure-canceling-process unit 65A cancels closure of the transmission-line interface with respect to a relevant transmission line, thereby activating the relevant backup transmission line 45. This ends the process of changing affiliation.

Figure 13:
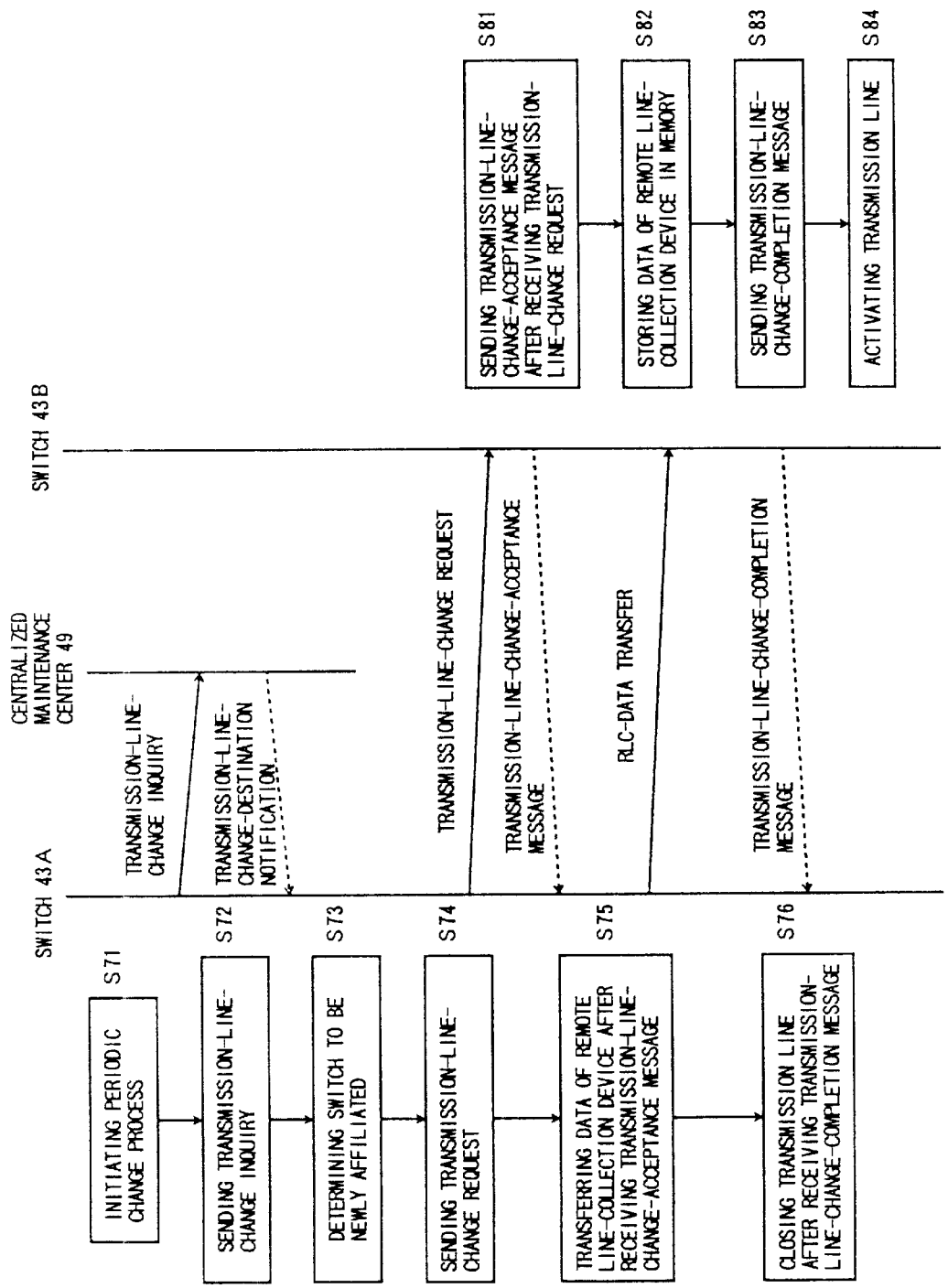
FIG. 13 is a line-change-process sequence and a flowchart of processes performed by switches according to a fourth embodiment of the present invention.

FIG. 13 is a line-change-process sequence and a flowchart of processes performed by switches according to a fourth embodiment of the present invention.

In the following, a description will be given first with regard to a process of the switch 43A with which the remote line-collection device 42A is affiliated.

At a step S71, the periodic-change-process unit 64B under the control of the cyclic-process unit 61B finds that it is the time to change transmission lines as such a change may be scheduled to take place at a predetermined timing. At this timing, control is handed over to the transmission-line-change-control unit 61A in order to attend to a transmission-line-change process.

At a step S72, the transmission-line-change-control unit 61A hands over control to the transmission-line-message-process unit 62C, and a transmission-line-change-inquiry message is edited and transmitted via the message-exchange unit 61C in order to make inquiries to the centralized maintenance center 49 about a new switch with which the remote line-collection device 42A will be affiliated. When the message is transmitted, a data-use volume of the remote line-collection device 42A is attached to the message.

The centralized maintenance center 49 determines a new switch, to which the remote line-collection device 42A will belong. Then, the message-exchange unit 61C receives a transmission-line-change-notification message from the centralized maintenance center 49.

At a step S73, the transmission-line-change-control unit 61A attends to processing for determining a new switch.

After the new switch is determined, at a step S74, the transmission-line-message-process unit 62C edits a transmission-line-change-request message, and transmits it to the new switch 43B via the message-exchange unit 61C. This message notifies the new switch 43B of a change of transmission lines, and, also, makes sure that the new switch 43B is not suffering a malfunction, a process congestion, or the like, and is thus in condition for accepting the change.

At a step S75, the message-exchange unit 61C receives a transmission-line-change-acceptance message from the new switch, and, then, the RLC-data-transfer unit 63C is activated by the transmission-line-change-control unit 61A so as to transfer the RLC data of the remote line-collection device 42A to the new switch 43B.

At a step S76, the message-exchange unit 61C receives a transmission-line-change-completion message from the new switch, and, then, the transmission-line-closure-process unit 64A under the control of the transmission-line-change-control unit 61A closes the transmission-line interface 52 of the relevant transmission line. This ends the transmission-line-change process.

In the following, a description will be given with regard to a process of the newly affiliated switch 43B.

At a step S81, the message-exchange unit 61C receives the transmission-line-change-request message, and, then, the transmission-line-change-control unit 61A checks the backup-storage area 72 of FIG. 5B so as to determine whether there is a sufficient space for controlling the remote line-collection device. If there is a sufficient space, the transmission-line-message-process unit 62C edits the transmission-line-change-acceptance message, and transmits it via the message-exchange unit 61C. Here, transmission of the transmission-line-change-acceptance message does not necessarily have to be carried out.

At a step S82, the RLC data is received from the old switch 43A, and the transmission-line-change-control unit 61A stores the received data in the backup-storage area 72.

At a step S83, the transmission-line-message-process unit 62C edits the transmission-line-change-completion message, and transmits it to the old switch via the message-exchange unit 61C.

At a step S84, the transmission-line-closure-canceling-process unit 65A cancels closure of the transmission-line interface with respect to a relevant transmission line, thereby activating the relevant backup transmission line 45. This ends the process of changing affiliation.

Figure 14:
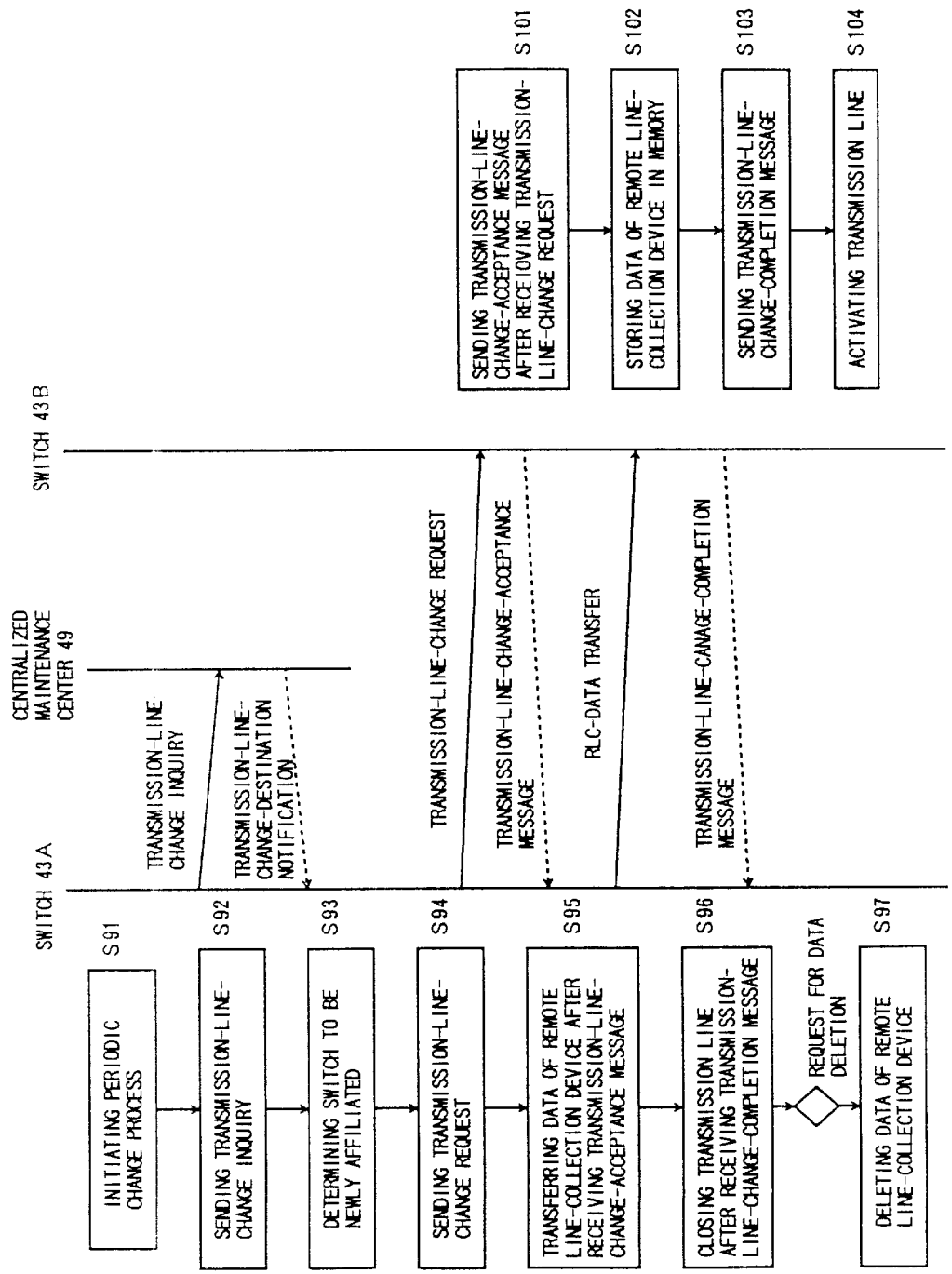
FIG. 14 is a line-change-process sequence and a flowchart of processes performed by switches according to a fifth embodiment of the present invention.

FIG. 14 is a line-change-process sequence and a flowchart of processes performed by switches according to a fifth embodiment of the present invention.

In the following, a description will be given first with regard to a process of the switch 43A with which the remote line-collection device 42A is affiliated.

At a step S91, the periodic-change-process unit 64B under the control of the cyclic-process unit 61B finds that it is the time to change transmission lines as such a change may be scheduled to take place at a predetermined timing. At this timing, control is handed over to the transmission-line-change-control unit 61A in order to attend to a transmission-line-change process.

At a step S92, the transmission-line-change-control unit 61A hands over control to the transmission-line-messageprocess unit 62C, and a transmission-line-change-inquiry message is edited and transmitted via the message-exchange unit 61C in order to make inquiries to the centralized maintenance center 49 about a new switch with which the remote line-collection device 42A will be affiliated. When the message is transmitted, a data-use volume of the remote line-collection device 42A is attached to the message.

The centralized maintenance center 49 determines a new switch, to which the remote line-collection device 42A will belong. Then, the message-exchange unit 61C receives a transmission-line-change-notification message from the centralized maintenance center 49.

At a step S93, the transmission-line-change-control unit 61A attends to processing for determining a new switch.

After the new switch is determined, at a step S94, the transmission-line-message-process unit 62C edits a transmission-line-change-request message, and transmits it to the new switch 43B via the message-exchange unit 61C. This message notifies the new switch 43B of a change of transmission lines, and, also, makes sure that the new switch 43B is not suffering a malfunction, a process congestion, or the like, and is thus in condition for accepting the change.

At a step S95, the message-exchange unit 61C receives a transmission-line-change-acceptance message from the new switch, and, then, the RLC-data-transfer unit 63C is activated by the transmission-line-change-control unit 61A so as to transfer the RLC data of the remote line-collection device 42A to the new switch 43B.

At a step S96, the message-exchange unit 61C receives a transmission-line-change-completion message from the new switch, and, then, the transmission-line-closure-process unit 64A under the control of the transmission-line-change-control unit 61A closes the transmission-line interface 52 of the relevant transmission line.

After closing the transmission line, at a step S97, the transmission-line-change-control unit 61A refers to the RLC-data-transfer-type indicator 83 stored in the memory 53 as shown in FIG. 6 if the centralized maintenance center 49 requests a deletion of data, and activates the memory-erasure-process unit 62A to delete the RLC data from the backup-storage area 72. This achieves an efficient use of a memory area by using this newly created memory area for controlling another remote line-collection device when another switch requests a connection of a backup transmission line 45 to the switch 43A.

In the following, a description will be given with regard to a process of the newly affiliated switch 43B.

At a step S101, the message-exchange unit 61C receives the transmission-line-change-request message, and, then, the transmission-line-change-control unit 61A checks the backup-storage area 72 of FIG. 5B so as to determine whether there is a sufficient space for controlling the remote line-collection device. If there is a sufficient space, the transmission-line-message-process unit 62C edits the transmission-line-change-acceptance message, and transmits it via the message-exchange unit 61C. Here, transmission of the transmission-line-change-acceptance message does not necessarily have to be carried out.

At a step S102, the RLC data is received from the old switch 43A, and the transmission-line-change-control unit 61A stores the received data in the backup-storage area 72.

At a step S103, the transmission-line-message-process unit 62C edits the transmission-line-change-completion message, and transmits it to the old switch via the message-exchange unit 61C.

At a step S104, the transmission-line-closure-canceling-process unit 65A cancels closure of the transmission-line interface with respect to a relevant transmission line, thereby activating the relevant backup transmission line 45. This ends the process of changing affiliation.

Figure 15:
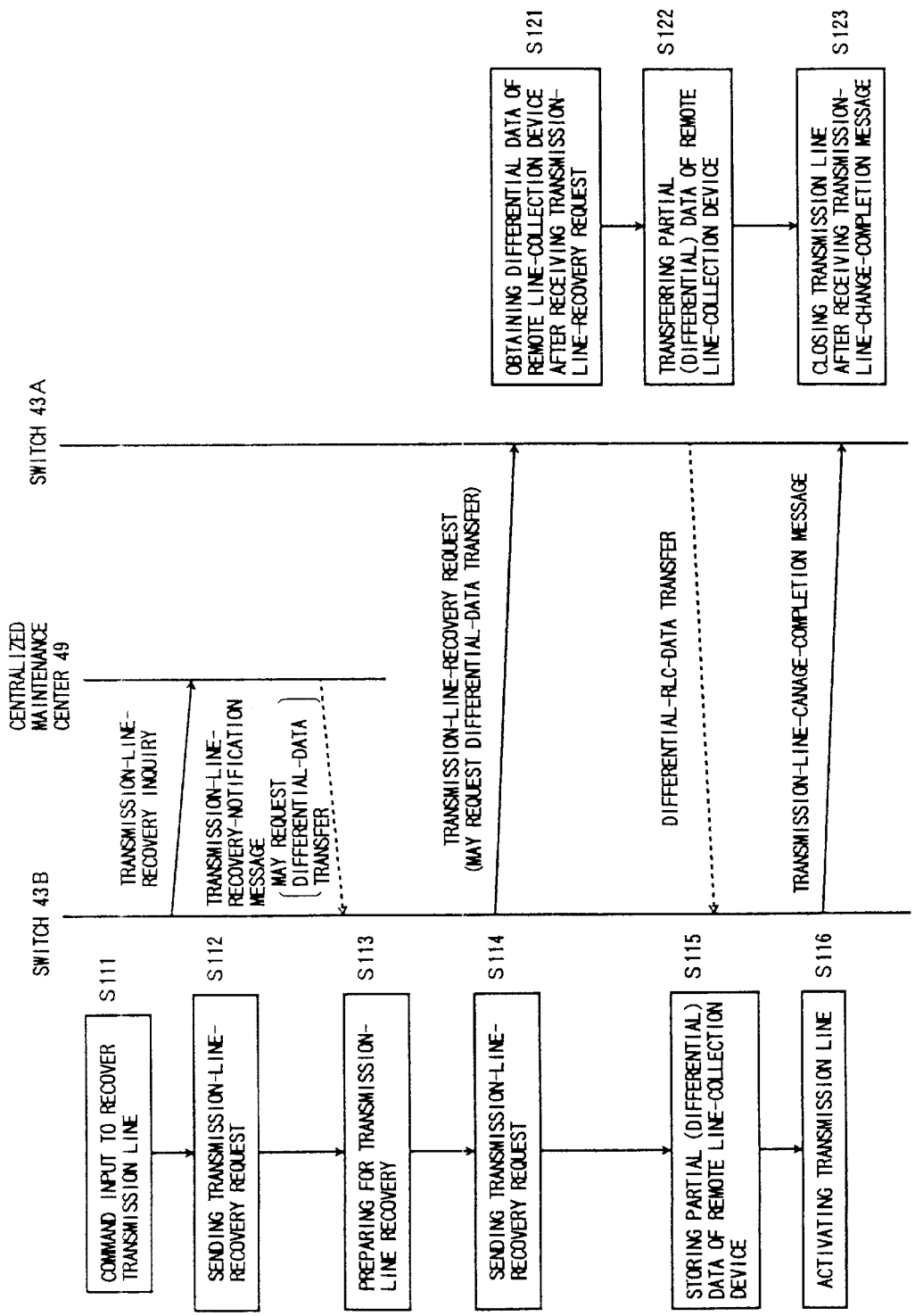
FIG. 15 is a recovery-line-change-process sequence and a flowchart of processes performed by switches according to a sixth embodiment of the present invention.

FIG. 15 is a recovery-line-change-process sequence and a flowchart of processes performed by switches according to a sixth embodiment of the present invention.

In this embodiment, affiliation of the remote line-collection device 42A is changed from the switch 43A to the switch 43B. If the RLC data of the remote line-collection device 42A is modified at the switch 43B after the affiliation change, the change of data is stored in part of the backup-storage area 72 as differential data. When the switch 43A requests recovery of the transmission line, only the differential data is transferred, thereby reducing a time required for the data transfer.

In the following, a description will be given first with regard to a process of the old switch 43B with which the remote line-collection device 42A was originally affiliated.

At a step S111, a command is entered at the maintenance terminal 55 of the switch 43B in order to return an affiliation of the remote line-collection device 42A from the switch 43A to the switch 43B.

After the command accepting unit 61D accepts the affiliation-return command, at a step S112, the transmission-line-change-control unit 61A hands over control to the transmission-line-message-process unit 62C, and a transmission-line-recovery-inquiry message is edited and transmitted via the message-exchange unit 61C in order to make inquiries to the centralized maintenance center 49 about recovery of the transmission line of the remote line-collection device 42A.

After the message-exchange unit 61C receives a transmission-line-recovery-notification message from the centralized maintenance center 49, at a step S113, the transmission-line-change-control unit 61A attends to processing for determining recovery of affiliation.

In detail, the RLC-affiliation-setting primary table of FIG. 7 in the centralized maintenance center 49 is referred to by using a switch number, and a RLC-affiliation-setting secondary table corresponding to the switch is obtained by using the switch-address pointer. Then, reference is made to the RLC-affiliation-setting secondary table by using a RLC number of the remote line-collection device which needs to change an affiliation thereof. As a result, the RLC-affiliated-switch number 93, the data-area-use indicator 94, the RLC-data-transfer-type indicator 95, and the RLC-data-available-space volume 96 are obtained.

The centralized maintenance center 49 adds a data size of the data used by the remote line-collection device to the RLC-data-available-space volume 96. Then, the information described above is stored in the memory 53 by the affiliation-determination-process unit 63A as part of the RLC-affiliation-storage data 53 as shown in FIG. 6. The RLC-affiliation-storage data is referred to by the RLC number, and the number of the switch 43B that is to be newly affiliated with is set in the RLC-affiliated-switch number 81. Further, the RLC-data-transfer-type indicator 83 and the RLC-data-available-space volume 84 are set in accordance with the notified information, and the data-area-use indicator 82 is set so as to indicate an unused status.

After the affiliation recovery is decided, at a step S114, the transmission-line-message-process unit 62C edits a transmission-line-recovery-request message, and transmits it to the switch 43A via the message-exchange unit 61C. If the RLC-data-transfer-type indicator 83 is "all", transfer of the full RLC data is requested. If the RLC-data-transfer-type indicator 83 is "part", transfer of the differential information is requested. This message notifies the switch 43A of recovery of the transmission line, and, also, makes sure that the recovery is possible.

At a step S115, the transmission-line-change-control unit 61A stores the received RLC data in a relevant area of the data structure shown in FIG. 5A.

At a step S116, the transmission-line-closure-canceling-process unit 65A under the control of the transmission-line-change-control unit 61A cancels the closure of the transmission-line interface 52 with respect to a relevant transmission line. This activates the relevant transmission line 44, and ends the transmission-line-recovery process.

In the following, a description will be given with regard to a process of the switch 43A that is to be newly affiliated.

At a step S121, the message-exchange unit 61C receives the transmission-line-recovery-request message, and, then, the transmission-line-change-control unit 61A checks whether the request is directed to transfer of full data or transfer of differential data. If it is directed to the transfer of differential data, the RLC-data area of FIG. 5A is checked so as to extract differential data of the requested RLC data.

At a step S122, the transmission-line-change-control unit 61A edits the differential data, and transmits it via the message-exchange unit 61C.

At a step S123, the message-exchange unit 61C receives the transmission-line-change-completion message from the switch 43B, and, then, the transmission-line-closure-process unit 64A closes the transmission-line interface 52 with respect to a relevant transmission line. This closes the relevant backup transmission line 45, and ends the process of recovering an affiliation.

Figure 16:
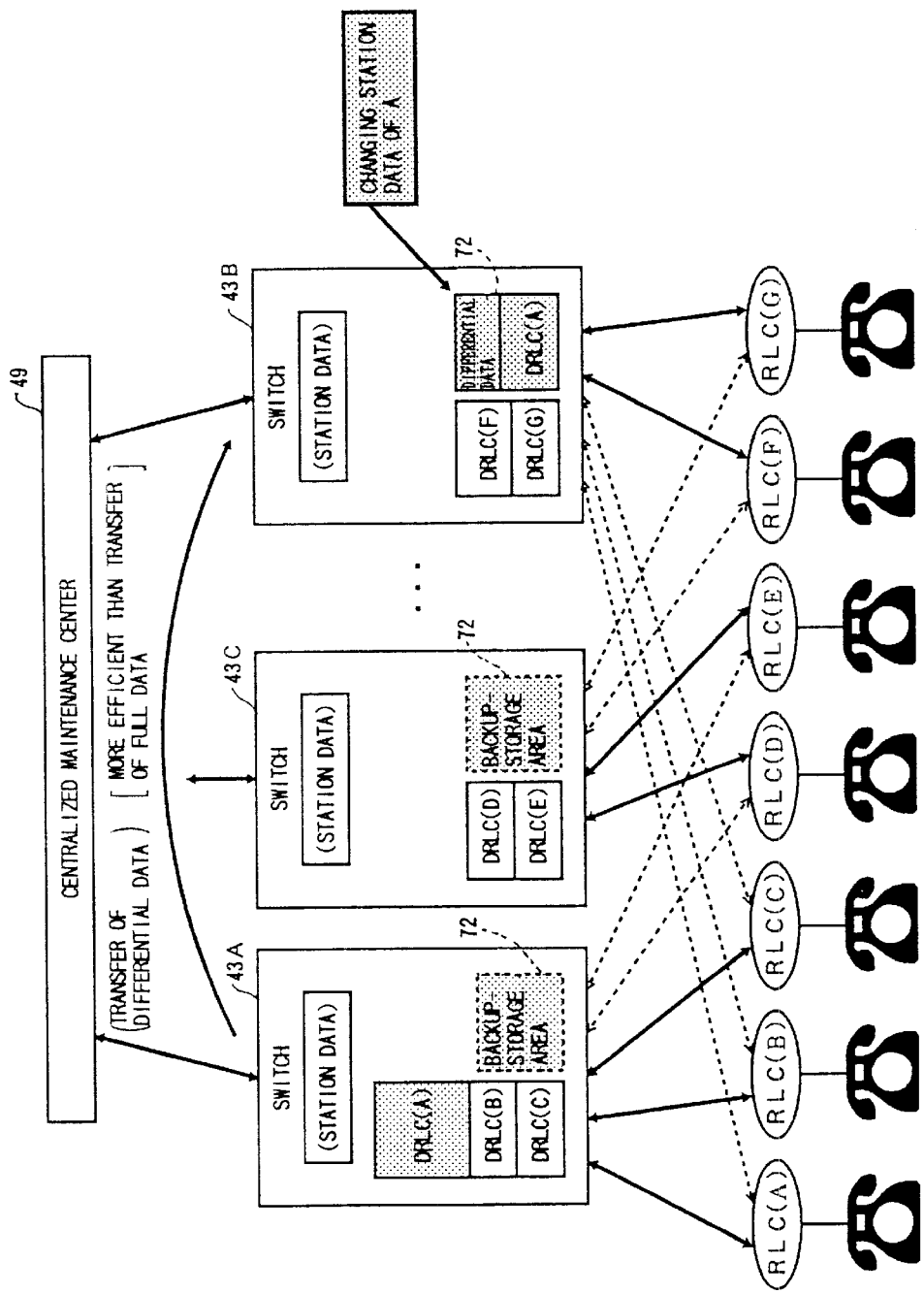
FIG. 16 is an illustrative for explaining the transfer of differential data.

FIG. 16 is an illustrative for explaining the transfer of differential data. As shown in FIG. 16 and as described in connection with FIG. 15, transfer of differential data from the switch 43A to the switch 43B is more efficient than the transfer of full data.

Figure 17:
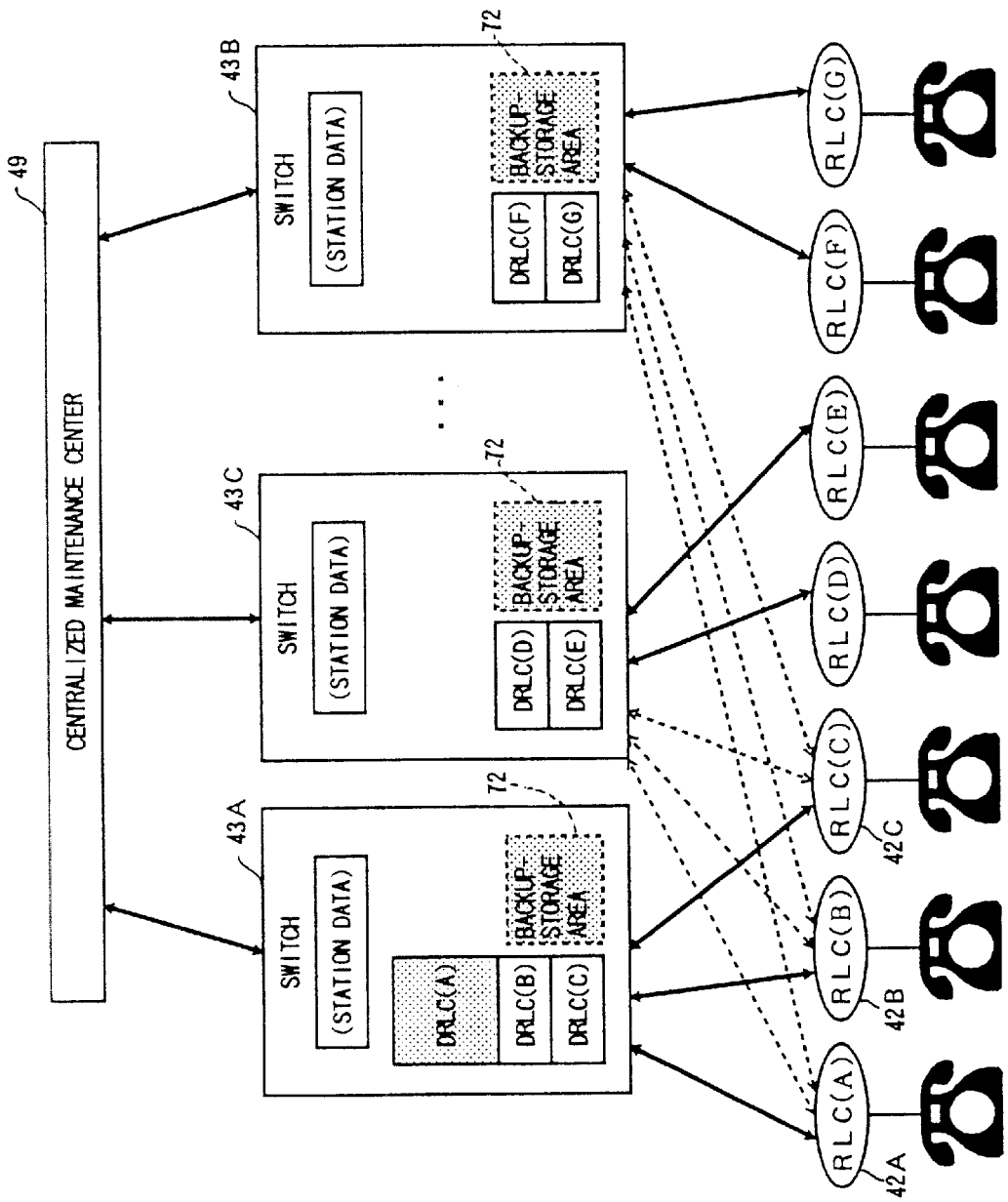
FIG. 17 is an illustrative drawing showing connections between switches and remote line-collection devices.

FIG. 17 is an illustrative drawing showing connections between the switches 43A through 43C and the remote line-collection devices 42A through 42C.

With reference to FIG. 17, a process of selecting an affiliation from a plurality of affiliations will be described. As shown in FIG. 17, the remote line-collection devices 42A through 42C normally associated with the switch 43A have backup affiliations with each of the switches 43B and 43C. The centralized maintenance center 49 performs centralized control of current affiliation with respect to all the remote line-collection devices by using the RLC-affiliation-setting data shown in FIG. 7. Because of this configuration, automatic selection of an appropriate switch is possible when affiliation needs to be changed for a given remote line-collection device.

Figure 18:
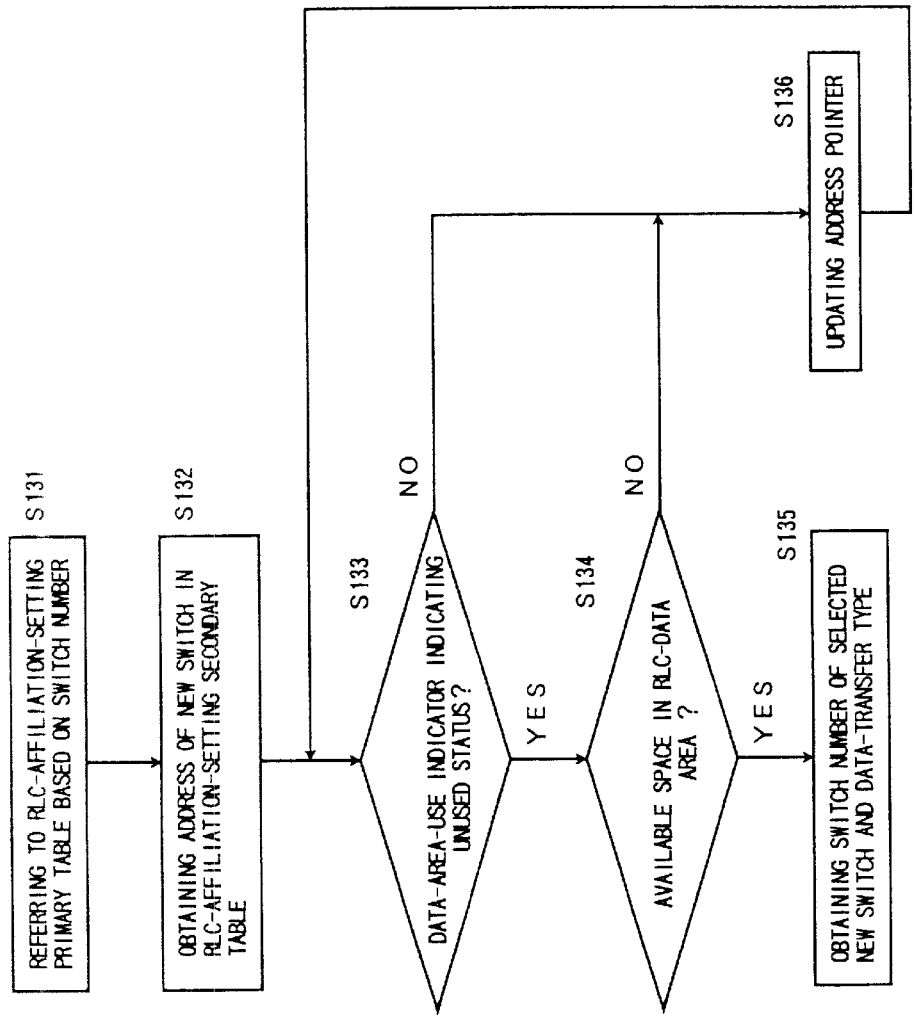
FIG. 18 is a flowchart of a process of selecting an affiliation from a plurality of affiliations according to a seventh embodiment of the present invention.

FIG. 18 is a flowchart of a process of selecting an affiliation from a plurality of affiliations according to a seventh embodiment of the present invention. This process is performed by the centralized maintenance center 49.

At a step S131, the RLC-affiliation-setting primary table of the RLC-affiliation-setting data in the centralized maintenance center 49 is made reference to by using a switch number. An entry of the RLC-affiliation-setting primary table that is made reference to stores an address pointer to the RLC-affiliation-setting secondary table, which corresponds to a switch from where affiliation is to be moved to another switch.

At a step S132, the RLC-affiliation-setting secondary table is obtained.

The RLC-affiliation-setting secondary table stores the RLC-affiliated-switch number 93, the data-area-use indicator 94, the RLC-data-transfer-type indicator 95, and the RLC-data-available-space volume 96 with respect to each candidate switch for each of the remote line-collection devices. Entries about the pertinent remote line-collection device is obtained by using a RLC number of this remote line-collection device.

At a step S133, a check is made on the data-area-use indicator 94 of the first candidate switch. If the data-area-use indicator 94 indicates availability of the space, at a step S134, the RLC-data-available-space volume 96 is checked by subtracting the used-data volume of the remote line-collection device therefrom to see if there is a sufficient available space.

If there is a sufficient available space, at a step S135, the data-area-use indicator 94 is changed so as to indicate use of the area, and the RLC-affiliated-switch number 93, the data-area-use indicator 94, and the RLC-data-transfer-type indicator 95 are obtained.

If either the step S133 finds that the data area is in use or the step S134 finds that an available space of the RLC-data area is not sufficient, at a step S136, the address pointer is updated so as to repeat the steps S133 and S134 with respect to a second candidate switch. The same procedure may be repeated with respect to a third candidate, a fourth candidate, and so on.

In this manner, a switch that can be newly affiliated with is selected automatically at the time when new affiliation is necessary. This configuration insures that an appropriate switch will be found even when the memory space of the backup-storage area 72 is limited to the smallest necessary size.

Further, the present invention is not limited to these embodiments, but various variations and modifications may be made without departing from the scope of the present invention.

The present application is based on Japanese priority application No. 11-039101 filed on Feb. 17, 1999, with the Japanese Patent Office, the entire contents of which are hereby incorporated by reference.

What is claimed is:

1. A method of controlling affiliation of a remote line-collection device with a plurality of switches connected via a network, comprising the steps of:

providing each switch with a backup-storage area in advance in addition to a normal storage area;

transferring control data of the remote line-collection device from the normal storage area of a first switch to the backup-storage area of a second switch when affiliation of the remote line-collection device is changed from the first switch to the second switch;

Obtaining differential data between the control data of the remote line-collection device and updated control data of the remote line-collection device when the control data of the remote line-collection device is updated at the second switch; and transferring the differential data from the second switch to the first switch when the affiliation of the remote line-collection device is returned from the second switch to the first switch.

2. A device for controlling affiliation of a remote line-collection device with a plurality of switches connected via a network, comprising a control-data transfer unit which transfers control data of the remote line-collection device from a normal storage area of a first switch to a backup-storage area of a second switch when affiliation of the remote line-collection device is changed from the first switch to the second switch, wherein each of the plurality of switches is provided with the normal storage area and the backup-storage area in advance;

wherein said control-data-transfer unit obtains differential data between control data of another remote line-collection device and updated control data of said another remote line-collection device when the control data of said another remote line-collection device is updated at the first switch after being transferred from the second switch, and transfers the differential data from the first switch to the second switch when affiliation of said another remote line-collection device is returned from the first switch to the second switch after being changed from the second switch to the first switch.

\* \* \* \* \*